J. H. HOENER.
SWEEP RAKE.
APPLICATION FILED SEPT. 9, 1912.
1,082,520.
Patented Dec. 30, 1913.
2 SHEETS—SHEET 2.
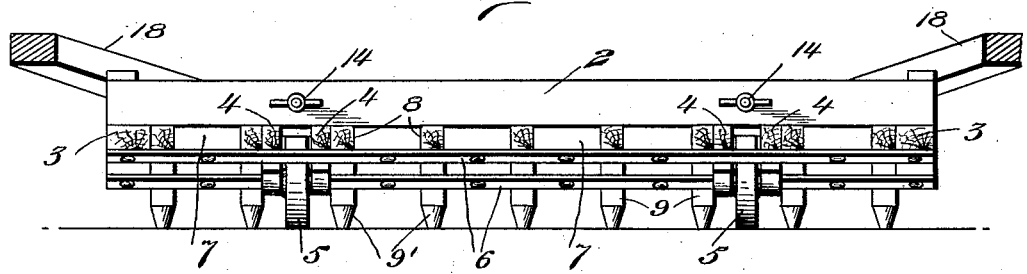
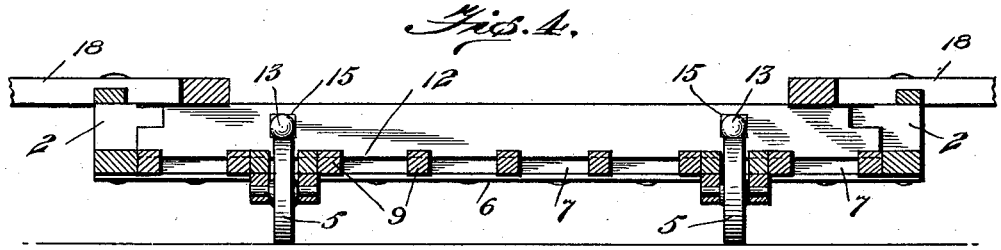
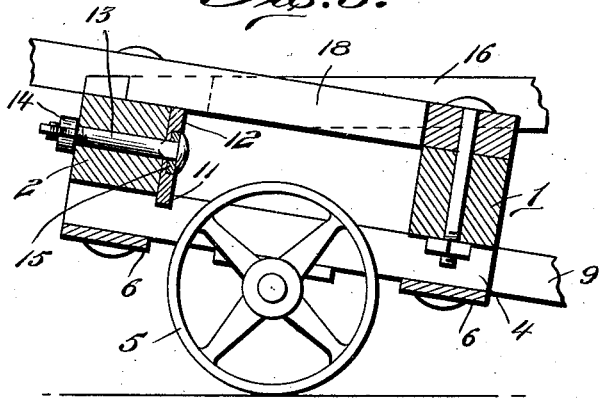
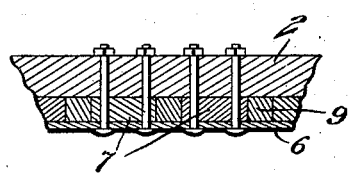
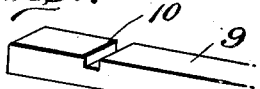
Witnesses
Inventor
J. H. Hoener
By
Attorneys

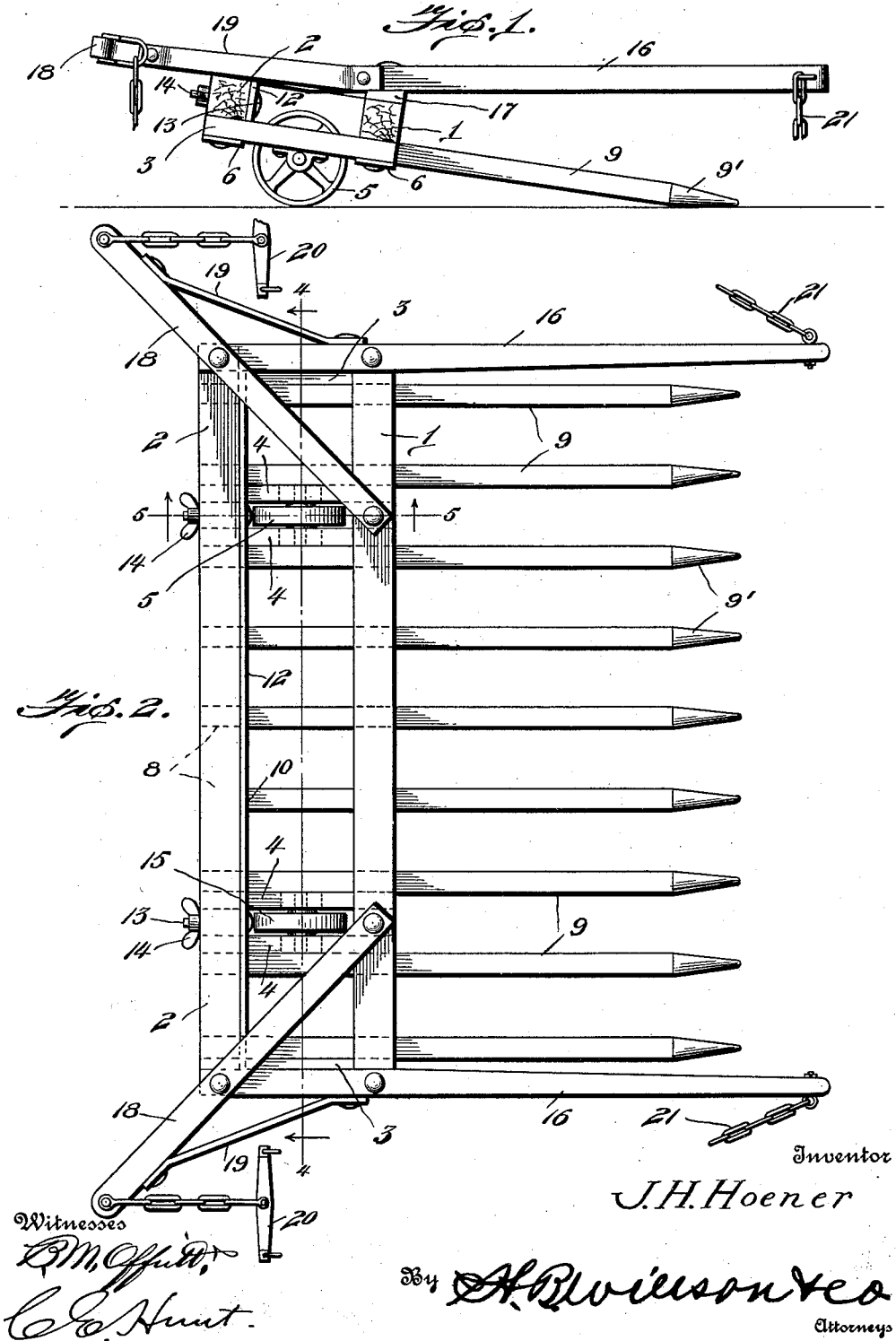

UNITED STATES PATENT OFFICE.

JOHN HENRY HOENER, OF SLATER, MISSOURI.

SWEEP-RAKE.

1,082,520.   Specification of Letters Patent.   Patented Dec. 30, 1913.

Application filed September 9, 1912. Serial No. 719,487.

*To all whom it may concern:*

Be it known that I, JOHN HENRY HOENER, a citizen of the United States, residing at Slater, in the county of Saline and State of Missouri, have invented certain new and useful Improvements in Sweep-Rakes; and I do declare the following to be a full, clear, and exact description of the invention, such as will enable others skilled in the art to which it appertains to make and use the same.

This invention relates to improvements in sweep rakes.

One object of the invention is to provide a rake of this character having an improved construction of head whereby the teeth are detachably secured in position.

Another object is to provide a sweep rake which will be simple, strong and durable in construction, efficient in operation and is provided with an improved means for attaching the draft animals thereto.

With these and other objects in view, the invention consists of certain novel features of construction, and the combination and arrangement of parts as will be more fully described and claimed.

In the accompanying drawings, Figure 1 is a side view of a sweep rake constructed in accordance with my invention; Fig. 2 is a top plan view thereof; Fig. 3 is a rear end view; Fig. 4 is a vertical cross sectional view taken on the line 4—4 of Fig. 2; Fig. 5 is a vertical longitudinal section taken on the line 5—5 of Fig. 2; Fig. 6 is a vertical cross sectional view taken through the rear end of the head showing the construction of the rear cross bar when an old rake is reconstructed to embody my invention; Fig. 7 is a detail perspective view of the inner portion of one of the teeth of the rake, showing the locking notch therein.

Referring more particularly to the drawings, 1 denotes the front cross bar and 2 denotes the rear cross bar forming part of the head of my improved rake. The front and rear cross bars are spaced a suitable distance apart and are connected at their ends by short longitudinal end bars 3 and between their ends by a series of short intermediate longitudinal bars 4, said bars 4 being preferably arranged in pairs. Revolubly mounted between and having their axles journaled in bearings on the lower sides of the intermediate bars 4 are rake supporting wheels 5. The short longitudinal bars 3 and 4 are secured to the lower sides of the front and rear cross bars 1 and 2 and to the lower sides of said longitudinal bars 3 and 4 at their ends are secured transversely disposed tooth supporting plates 6. Arranged between the lower sides of the front and rear cross bars 1 and 2 and their respective tooth fastening plates 6 are tooth spacing blocks 7 which in the construction of new rakes are formed integral with the bars 1 and 2 and which when old rakes are reconstructed to embody my invention are securely bolted to the bars 1 and 2 and their respective plates 6, the latter arrangement of the blocks being clearly illustrated in Fig. 6 of the drawings. The blocks 7 are spaced suitable distances from or disposed in position with respect to the adjacent ends of the bars 3 and 4 to form tooth receiving spaces 8 which engage the rear ends of the teeth 9 of the rake.

The teeth 9 may be of the usual or any suitable construction and as hereinbefore stated have their rear portions engaged with the spaces 8 between the bars 3 and 4 and the spacing blocks 7. On the outer ends of the teeth 9 are secured suitable metal points or shoes 9' whereby said ends of the teeth are prevented from being worn by constant engagement with the ground. In the upper sides of the teeth 9 adjacent to their rear ends and in line with the forward side of the rear cross bar 2 are locking notches 10, similar notches 11 being formed in the intermediate longitudinal bars 4. Adapted to be engaged with the notches 10 and 11 in the teeth 9 and bars 4 is a tooth locking plate 12 which is bolted to the rear cross bar 2 by a series of clamping bolts 13 which project through the bar 2 and have on their rear ends thumb nuts 14 whereby the bolts may be released by hand or without the use of a wrench. The ends of the bolts which are engaged with the bar 12 are squared and the apertures in the bar 12 with which the bolts are engaged are also squared thus holding the bolts against rotation when the nuts are screwed on and off the same.

The bar 12 may be formed of wood or metal as desired and when formed of wood as herein shown square washers 15 are set into one side of the bar at each of the bolt holes therein, said washers having square apertures to receive the squared portions of the bolts 13 as will be readily understood.

By constructing and arranging the tooth locking bar 12 as herein shown and described it will be seen that the teeth 9 will be firmly secured in place in the head of the rake when the bar 12 is in operative position and that when it is desired to remove any of the teeth it is simply necessary to release the locking bar 12 whereupon any or all of the teeth may be readily removed and replaced.

Secured to the ends of the front and rear cross bars 1 and 2 are draft tongues or poles 16, said tongues having their rear ends beveled or formed at an angle where they engage the upper side of the rear cross bar 2 and between the lower sides of the tongues 16 and the upper side of the front cross bar 1 are arranged wedge shaped spacing blocks 17 whereby the tongues are supported at an angle or project upwardly toward their forward ends as shown. Secured to the upper side of the front cross bar 1 and to the rear ends of the tongues 16 are draft bars 18, said bars being arranged obliquely across the bars 1 and 2 and have their rear ends projecting a suitable distance beyond the rear corners of the rake head as shown. The draft bars are firmly held in position by suitable brace bars 19 secured thereto and to the tongues 16 as shown. To the rear ends of the draft bars 18 are connected swingle trees 20 whereby the draft animals may be hitched to the side bars. To the outer ends of the tongues 16 are connected short chains 21 the free ends of which are adapted to be connected with the collars or other suitable part of the harness of the draft animals whereby the rake may be readily backed to draw the rake teeth out of a hollow or away from any obstruction which may be in the path of the rake.

By constructing my improved rake as herein shown and described it will be seen that should it become necessary to remove any of the teeth that this operation may be readily accomplished by one person without the use of a wrench or other tool. It will also be seen that old sweep rakes may be readily reconstructed to embody my invention so that the teeth thereof may be readily removed and replaced when necessary.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A sweep rake comprising front and rear cross bars having on their lower sides spacing blocks, longitudinally extending bearing supporting bars connecting the lower sides of said cross bars, teeth supporting plates secured to the lower sides of said longitudinal bars below said cross bars, teeth having their rear ends extending through the spaces between said cross bars and said teeth supporting plates and between said longitudinal bars and spacing blocks, said teeth having in their rear ends notches, and a tooth locking bar detachably secured to said rear cross bar and adapted to engage the notches in said teeth whereby the latter are detachably secured in operative position.

2. In a sweep rake front and rear cross bars having on their lower sides a series of spacing blocks, spacing bars connecting the extremities of said cross bars, bearing supporting bars intermediate said spacing bars and having their ends secured to the lower sides of said cross bars, teeth supporting plates secured to the lower side of the ends of said bearing supporting plates and said spacing bars, rake teeth detachably engaged between the teeth supporting plates, the cross bars, and the spacing blocks carried thereby, said teeth and bearing supporting bars having in their upper sides alined notches, a tooth locking bar adapted to be engaged with said notches whereby the teeth are held in operative position, clamping bolts to secure said bars to said rear cross bar, thumb nuts engaged with said bolts whereby the latter may be removed and said locking bar readily released to permit the removal of said teeth, and draft devices secured to the ends of said part and rear cross bars.

3. A sweep rake comprising front and rear cross bars, teeth supporting plates secured thereto, a plurality of teeth removably disposed between said supporting plates and said front and rear cross bars, said teeth having in their upper sides a transversely extending plate receiving notch, a locking plate secured to one of said cross bars and adapted to have a sliding engagement with said notches whereby some of said teeth may be removed and replaced without disturbing the adjacent teeth, draft tongues secured to said cross bars, said draft bars projecting rearwardly and laterally from the sides of the rake, braces engaged with the outer ends of said draft bars, means to hitch draft animals to the outer ends of said draft bars, and means to attach the animals to the outer ends of the tongues whereby the rake may be backed.

In testimony whereof I have hereunto set my hand in presence of two subscribing witnesses.

JOHN HENRY HOENER.

Witnesses:
ADOLF FISCHER,
HARVE TALBOTT.

Copies of this patent may be obtained for five cents each, by addressing the "Commissioner of Patents, Washington, D. C."